United States Patent [19]

Sturgeon

[11] Patent Number: 4,858,093
[45] Date of Patent: Aug. 15, 1989

[54] INTEGRATED MAGNETIC POWER CONVERTER

[75] Inventor: Clayton L. Sturgeon, Watauga, Tex.

[73] Assignee: Qualitron, Inc., Dallas, Tex.

[21] Appl. No.: 283,191

[22] Filed: Dec. 12, 1988

[51] Int. Cl.[4] .......................................... H02M 3/335
[52] U.S. Cl. ...................................... 363/20; 363/16; 363/21
[58] Field of Search ................... 323/355, 362; 363/16, 363/20, 21; 336/214, 215

[56] References Cited

U.S. PATENT DOCUMENTS

| | | | |
|---|---|---|---|
| 3,553,620 | 1/1971 | Cielo et al. | 363/25 |
| 3,694,726 | 9/1972 | Cielo et al. | 363/25 |
| 4,257,087 | 3/1981 | Cuk | 363/16 |
| 4,262,328 | 4/1981 | Bloom et al. | 363/16 |
| 4,274,133 | 6/1981 | Cuk et al. | 363/20 |
| 4,355,352 | 10/1982 | Bloom et al. | 363/16 |
| 4,675,796 | 6/1987 | Gautherin et al. | 363/20 |
| 4,774,649 | 9/1988 | Archer | 363/20 |

OTHER PUBLICATIONS

Cuk; "Integrated Magnetics vs Conventional Power Filtering"; Aug. 1987 IEEE.
Cuk et al.; "Advances in Switching-Mode Power Conversion"; Jun. 1980; IEEE Proceedings; pp. 485-496.
Severns et al., "Modern DC/DC Switchmode Power Converter Circuits"; Van Nostrand Reinhold Company; 1985.
Bloom; "New Integrated-Magnetic DC/DC Power Converter Circuits & Systems"; 1987 IEEE Applied Power Conference, Mar. '86.
Bloom; "Core Selection For Design Aspects of Integrated Magnetic Forward Converters"; May 1986 IEEE.
Bloom, Ed, "New Integrated Magnetic DC-DC Power Converter Circuits and Systems," *Powertechnics Magazine,* Mar. 1987, pp. 33-38.

Primary Examiner—Peter S. Wong
Assistant Examiner—Jeffrey Sterrett
Attorney, Agent, or Firm—Ross, Howison, Clapp & Korn

[57] ABSTRACT

An integrated magnetic power converter for supplying power to a load includes a continuous magnetic structure having first and second legs and a magnetic path therebetween. A primary winding is wound on the first leg. A first secondary winding is wound on the second leg and is connected to the load. A second secondary winding in series with the first secondary winding is wound on the first leg. A first circuit is connected to the primary winding for supplying energy to the power converter. A second circuit is connected to the secondary windings, and a third circuit is connected to the secondary windings for alternatively transferring energy to the load. When energy is supplied to the primary winding, a magnetic flux is produced in the magnetic path for transferring energy to the load via the first secondary winding and the third circuit, and an amount of energy is stored in the area surrounding the magnetic structure and the magnetic path. When energy supplied to the primary winding is removed, the stored energy induces a magnetic flux in the magnetic path and power is transferred to the load via the secondary windings and the second circuit.

27 Claims, 5 Drawing Sheets

INTEGRATED MAGNETIC POWER CONVERTER

TECHNICAL FIELD

This invention relates to power systems and devices, and more particularly to a combined transformer and inductor device having a distributed gap, mismatched secondary windings, and a self-resetting core.

BACKGROUND OF THE INVENTION

The combination of an inductive as well as a transformer element of a power converter on a single core structure is referred to as magnetic integration. The consolidated magnetic system, if integrated properly, has many of the desired characteristics of the original converter circuit. In many instances, magnetic integration will also produce a converter arrangement which achieves reduced voltage stress on semiconductors. Various integrated magnetic power converter circuits and systems have been suggested in which multiple windings and circuit elements are required. Such systems further require windings on an air-gap leg of the core. As a result, the systems are relatively costly due to the number of components required and manufacturing costs involved. Additionally, problems exist with leakage induction between primary and secondary windings, lowering the efficiency of such power converters.

A need has thus arisen for an integrated magnetic power converter with improved electrical efficiency, and flexibility with material efficiency which is simple in design. Additionally, a need has arisen for an integrated magnetic power converter which is capable of efficient operation a high frequencies.

SUMMARY OF THE INVENTION

In accordance with the present invention, an integrated magnetic power converter for supplying power to a load is provided. The power converter includes a continuous magnetic structure having first and second legs and a magnetic path therebetween. A primary winding is wound on the first leg. A first secondary winding is wound on the second leg and is connected to the leg load. A second secondary winding in series with the first secondary winding is wound on the first leg. A first circuit is connected to the primary winding for supplying energy to the power converter. A second circuit is connected to the secondary windings, and a third circuit is connected to the secondary windings for alternately transferring energy to the load. When energy is supplied to the primary winding, a magnetic flux is produced in the magnetic path for transferring energy to the load via the first secondary winding and the third circuit, and an amount of energy is stored in the area surrounding the magnetic structure and the magnetic path. When energy supplied to the primary winding is removed, the stored energy induces a magnetic flux in the magnetic path and power is transferred to the load via the secondary windings and the second circuit.

In accordance with another aspect of the present invention, a method for transferring energy to a load using an integrated magnetic power converter is provided. The method includes periodically supplying power to a primary winding of the power converter. Energy is transferred from the primary winding to a first secondary winding of the power converter by the core when power is supplied to the primary winding. During this time, energy transfer from a second secondary winding to the first secondary winding is prevented. Energy is transferred from the second secondary winding to the first secondary winding of the converter when power is removed from the primary winding. This energy being induced in the second secondary winding from energy stored in the area around the converter core. The flux level in the core is reset to zero by storing energy in a storage element when power is removed from the primary winding. The first secondary winding is wound with a greater number of turns than the second secondary winding to lower the flux level in the core prior to supplying power to the primary winding.

BRIEF DESCRIPTION OF DRAWINGS

For a more complete understanding of the present invention and for further advantages thereof, reference is now made to the following Description of the Preferred Embodiments taken in conjunction with the accompanying Drawings in which.

DETAILED DESCRIPTION OF THE PREFERRED EMBODIMENTS

Figure 1:
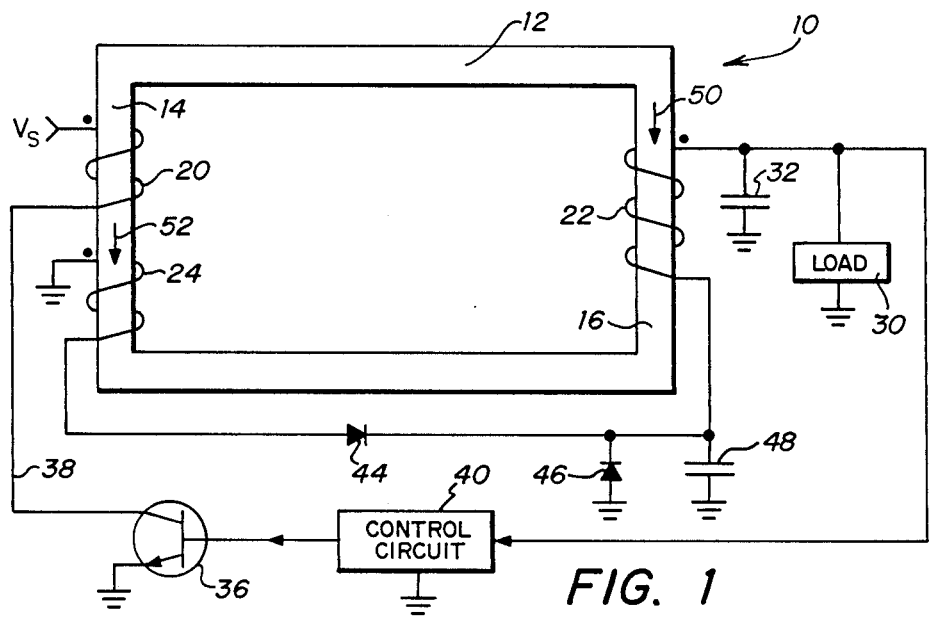
FIG. 1 is a schematic and electrical circuit diagram of an integrated magnetic power converter in accordance with the present invention.

Referring to FIG. 1, the present integrated magnetic power converter is illustrated, and is generally identified by the numeral 10. Integrated magnetic power converter 10 (hereinafter referred to as the present power converter) combines a transformer and inductor device and in a single magnetic structure having a continuous core 12 of magnetic material. Core 12 includes a first leg 14 and a second leg 16. Core 12 may be shaped, for example, in the form of a toroid.

A primary winding 20 is wound around leg 14. A first secondary winding 22 is wound around leg 16, and a second secondary winding 24 is wound around leg 14. Secondary windings 22 and 24 are connected in series around core 12. The number of turns for windings 20, 22 and 24, shown in FIG. 1 are shown for illustrative purposes only, it being understood that the actual number of turns may vary depending upon the specific application for the integrated magnetic power converter of the present invention, and the actual number of turns in a preferred embodiment will be further discussed herein. The manner in which the windings of primary and secondary windings, 20 and 22–24, respectively, are wound on their respective legs to illustrate their respective polarities is according to the dot notation. Primary winding 20 is wound in the same direction as second secondary winding 24 around leg 14.

The output of first secondary winding 22 is coupled to a load 30 which is connected between the output of first secondary winding 22 and ground potential. Connected across load 30 is a filtering capacitor 32.

A power supply $V_S$ is applied to the input of primary winding 20 on first leg 14. The power supply may comprise for example, a DC source which is converted into an AC signal through the operation of a switch 36, which is serially connected to the output of primary winding 20 by a signal line 38. Switch 36 may comprise for example a transistor whose collector is connected to the output of primary winding 20, the emitter at ground potential and the base connected to a control circuit 40 which is connected across load 30. It will be understood that control circuit 40 may be of a conventional form for detecting variations across load 30 and for providing appropriate regulation control output signals to switch 36. Control circuit 40 may comprise, for example, a pulse width modulator.

Interconnected in series with the in-phase side of the second secondary winding 24 and the in-phase side of first secondary winding 22 is a rectifier element or diode 44. Interconnected across second secondary winding 24 and in series with first secondary winding 22 is a rectifier element or diode 46 in addition to a capacitor 48.

Figure 2:
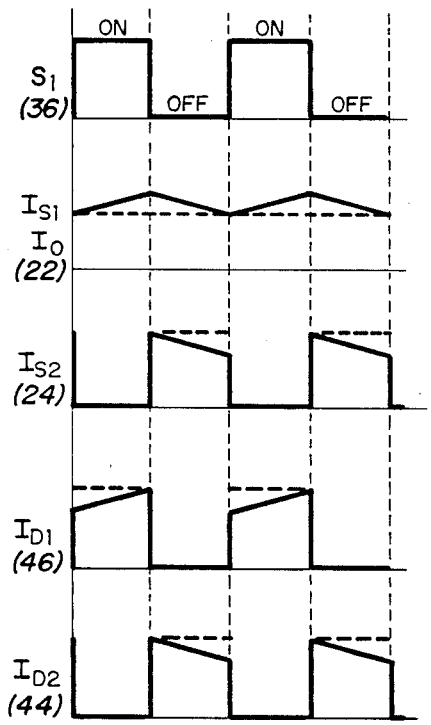
FIG. 2 is a plurality of timing diagrams illustrating the waveforms of pertinent signals of the circuit shown in FIG. 1.

Referring simultaneously to FIGS. 1 and 2, the operation of the present power converter 10 will now be described. FIG. 2 illustrates the various timing graphs of periods in which switch 36 ($S_1$) is on and off. $I_{S1}$ and $I_O$ represent the current flowing in first secondary winding 22 and the output current of power converter 10. $I_{S2}$ represents the current flowing in second secondary winding 24. $I_{D1}$ represents the current flowing in diode 46, and $I_{D2}$ represents the current flowing in diode 44. When switch 36 is on, energy is transferred through the magnetic system of power converter 10 from primary winding 20 to first secondary winding 22 to load 30. Flux due to current $I_O$ builds up within core 12 in the direction of arrow 50. During the on time of switch 36, current flowing through diode 46 increases and current flowing through first secondary winding 22 increases. Due to the phasing relationships of the windings on leg 14, diode 44 is back biased and does not conduct during intervals when switch 36 is on. Further, no current flows through second secondary winding 24 of leg 14. During conduction of switch 36, inductive energy is stored in the area surrounding core 12. This area forms a distributed air gap for storage of this inductive energy, requiring no gapped leg of core 12.

During the off time interval of switch 36, the winding polarities of primary winding 20 and second secondary winding 24 reverse, and diode 44 is forward biased and now conducts. Diode 44 provides a path to first secondary winding 22 for transferring the inductive energy stored around core 12. As shown in FIG. 2, the current flowing within diode 46 is zero, whereas the current flowing within diode 44 initially increases to a maximum when switch 36 is turned off and thereafter decreases. Current flows in both first and second secondary windings 22 and 24, respectively, since diode 44 is now forward-biased to produce an output current $I_O$ which is decreasing in magnitude. The flux in core 12 when switch 36 is off is indicated by arrow 52. It therefore can be seen that the repetitive pattern of switch 36 being on and off results in a continuous output current which increases and decreases when applied to load 30.

And important aspect of the present invention is the use of capacitor 48 which functions to store core 12 energy when switch 36 is off. The storage of this energy by capacitor 48 results in decreasing the flux density within core 12 in order to reset the flux level to its original value prior to turn on of switch 36 in the next subsequent time period. Capacitor 48 therefore functions as a reset device so that the cycle can be repeated. The energy stored within capacitor 48 when switch 36 is off is then applied to the load 30 when switch 36 is on. This discharge improves the overall efficiency of the power converter 10.

In the preferred embodiment of the present invention, there is a mismatch between the number of turns of first secondary winding 22 and second secondary winding 24. The number of turns in first secondary winding 22 may be, for example, ten turns, while the number of turns in second secondary winding 24 may be, for example, nine turns. This mismatch results in a lower or net negative flux level in leg 14 of core 12 prior to the time when switch 36 turns on which is advantageous in that a smaller core can deliver increased power because the turn mismatch has increased the allowable AC flux swing before saturation occurs in the core. If the number of windings of second secondary winding 24 is less than the number of windings of first secondary winding 22, the flux generated by the current in first secondary winding 22 is opposite in direction and greater than the flux generated by the current flowing within second secondary winding 24. The flux density level is then driven more negative in leg 14 than had the secondary windings had equal turns. This aspect of the present invention will be further discussed with respect to FIG. 9.

Figure 3:
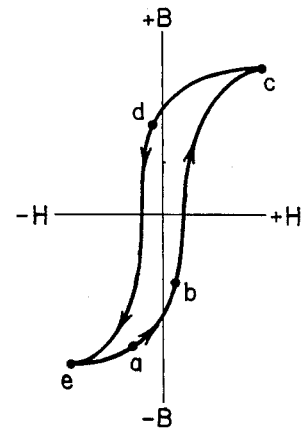
FIG. 3 is a magnetic flux density-magnetic field intensity hysteresis loop of the core of the integrated magnetic power converter of FIG. 1.

The present invention including the mismatch of windings and use of a reset capacitor will be further appreciated with respect to FIG. 3 which illustrates a dynamic hysteresis loop or magnetic flux density (B)—magnetic field intensity (H) curve of core 12. Assuming that the power source is connected to power converter 10 with the core in a given magnetic condition designated as a, when switch 36 turns on, the transition from a to b embraces a regenerative sequence of events culminating with the core beginning to saturate in the positive direction at reference c. Switch 36 then turns off and capacitor 48 begins to store energy from the energy stored in the area around and within core 12. This core energy being stored within capacitor 48 causes the flux within core 12 to decrease to its original value in order to reset the flux level within core 12. As point d is approached, the core goes out of saturation. Since there is a negative net flux caused by the mismatch of the number of windings between first secondary winding 22 and second secondary winding 24, the flux level is driven negative to point e, and the switching cycle begins again. Since the flux level is driven to point e, the present invention provides for an increased allowable AC flux swing before core saturation can occur.

Capacitor 48 provides an overall efficiency increase in the operation of power converter 10 by shifting energy to the load when switch 36 begins to conduct. Further, capacitor 48 results in a faster resetting of the flux level within core 12. This faster reset allows the 50% duty cycle of the present power converter to increase such that the off time of switch 36 can be less.

The rate of reset of the magnetic flux depends upon the amount of the voltage on capacitor 48. This voltage varies depending on how far the flux varies from zero.

To summarize, the present power converter 10 provides for the elimination of any air gap within core 12 resulting in a core which is more efficient and smaller in size. The use of capacitor 48 increases the efficiency of power converter 10 by shifting energy stored within core 12 while switch 36 is off to load 30. Capacitor 48 further functions as a flux reset mechanism for reducing the flux within core 12 at a variable rate prior to switch 36 turning on. Further, an important aspect of the present invention is the mismatch between a number of turns of first secondary winding 22 and second secondary winding 24 to drive the flux negatively prior to switch 36 turning on. The power throughput of power converter 12 is thereby substantially increased. The space surrounding core 12 constitutes a distributed air gap for storing energy while switch 36 is on and the magnetic flux in this air gap collapsed thereby inducing energy in the secondary windings 22 and 24 when switch 36 is off. By storing energy within the area surrounding core 12, less material is needed for core 12 since no leg is required for supporting an energy storing winding which results in less cost and material.

Figure 4:
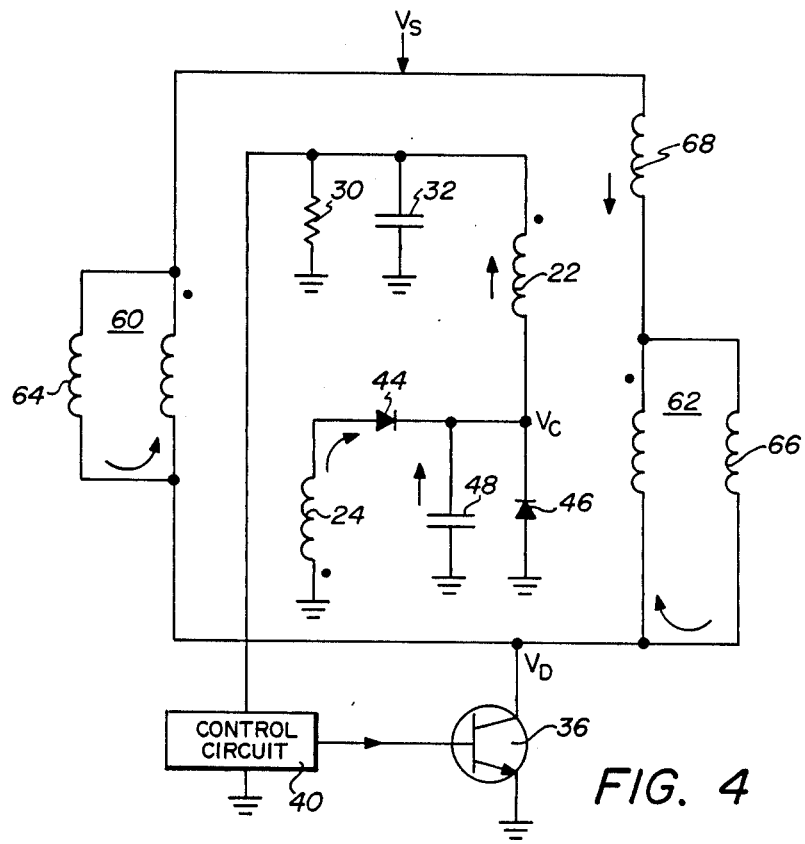
FIG. 4 represents an electric circuit equivalent of the integrated magnetic power converter shown in FIG. 1.

Referring now to FIG. 4, an electric circuit equivalent of power converter 10 is illustrated. Like numerals are utilized for like and corresponding elements previously identified. The arrows indicate the direction of current flow in the various circuit elements. Core 12 is represented by two transformers 60 and 62. Windings 64 and 66 are the exciting inductants of transformers 60 and 62, respectively. Inductor 68 represents the energy storage inductance due to leakage flux of windings 20, 24 and 22. The voltage, $V_D$ at switch 36 is clamped by the turns ratio (number of turns in primary winding 20 divided by the number of turns in secondary winding 24 multiplied by $V_C$). All of the exciting current for transformers 60 and 62 flowing through inductors 64 and 66 flow via primary to secondary transformation into capacitor 48 which increases the voltage at node $V_C$ when switch 36 is switched off until the currents in inductors 64 and 66 are zero and the flux in transformers 60 and 62 are reset to zero.

When switch 36 is on again, the energy stored within capacitor 36 is forced through windings 22 to load 30. Since this energy is not lost or circulated, but is transferred to load 30, this mechanism results in higher efficiency of power converter 10. If the inductors 64 and 66 currents are not zero when switch 36 is again in an on condition, the resulting exciting currents at the end of an off period of switch 36 will be higher and will charge capacitor 48 to a higher voltage tending to reduce the currents within inductors 64 and 66 faster. This automatic reduction constitutes the present invention reset mechanism which allows variation of the reset voltage to vary the rate at which the magnetic flux density decreases to zero within core 12.

Figure 5:
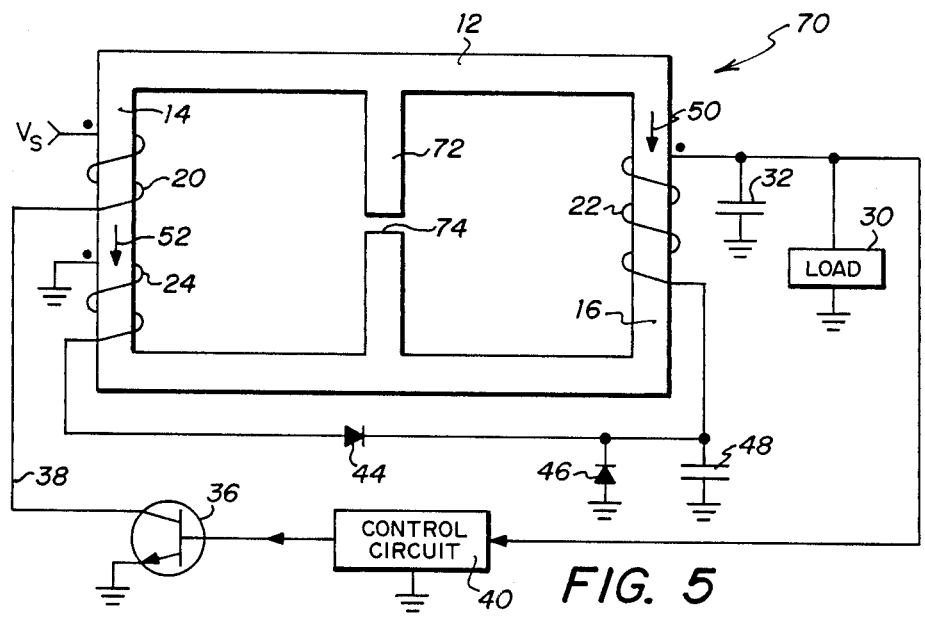
FIG. 5 is a further embodiment of the present integrated magnetic power converter.

FIG. 5 illustrates a further embodiment of the present invention including a power converter generally identified by the numeral 70. Like numerals are used for like and corresponding elements previously identified with respect to FIG. 1. Power converter 70 includes an air-gapped leg 72 disposed between legs 14 and 16 of core 12. Power converter 70 operates in a manner similar to power converter 10. However, gap 74 functions to store energy when switch 36 is on. It is important to note that there is no energy storage winding around leg 72, and that all energy storage during conduction of switch 36 takes place within air gap 74.

Figure 6:
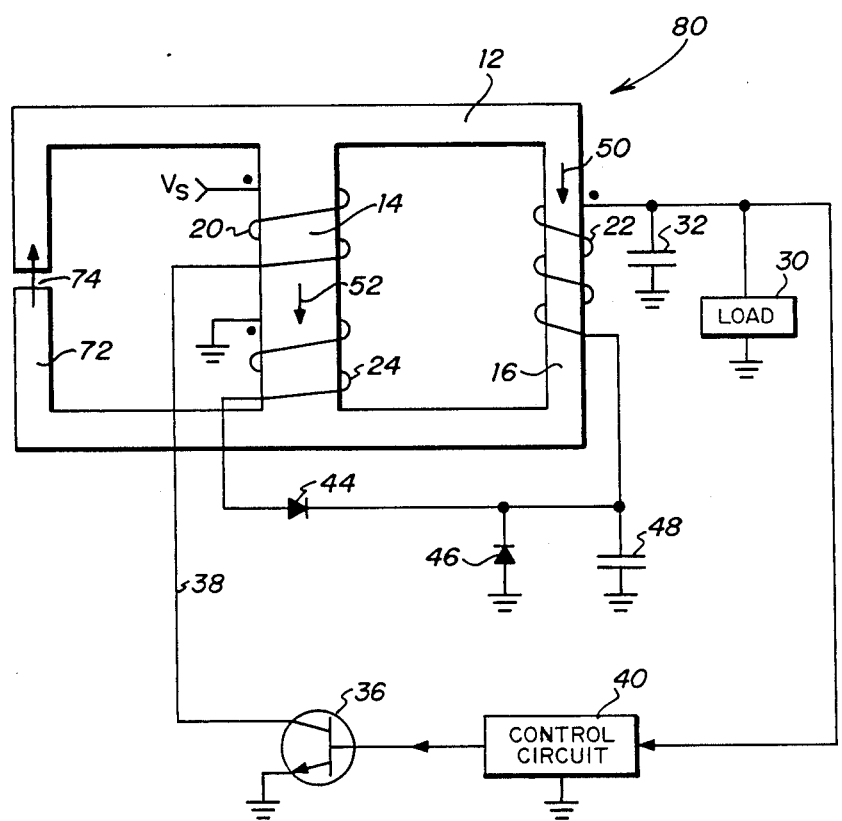
FIG. 6 is a further embodiment of the present integrated magnetic power converter.

FIG. 6 illustrates a further embodiment of the present invention including a power converter generally identified by the numeral 80. Like numerals are used for like and corresponding elements previously identified with respect to FIGS. 1 and 5. The position of air-gapped leg 72 and leg 14 have been interchanged to allow leg 14 to have a larger cross-sectional area. Leg 14 carries both the exciting flux and the flux passing through gap 74, and therefore the flux density in leg 14 will tend to be greater than in legs 72 and 16.

Figure 7:
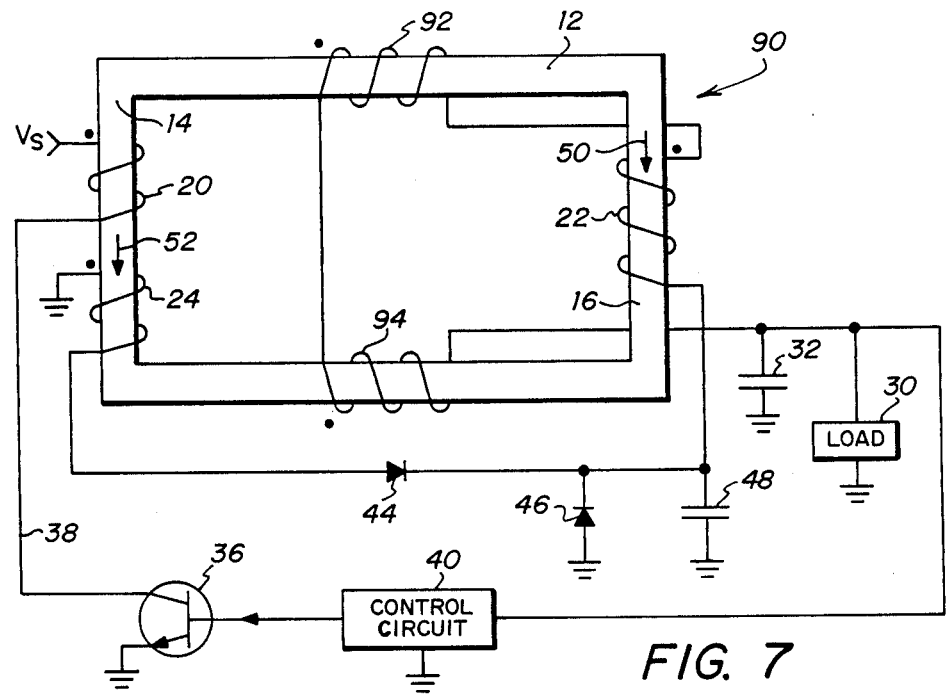
FIG. 7 is a further embodiment of the present integrated magnetic power converter.
Figure 8:
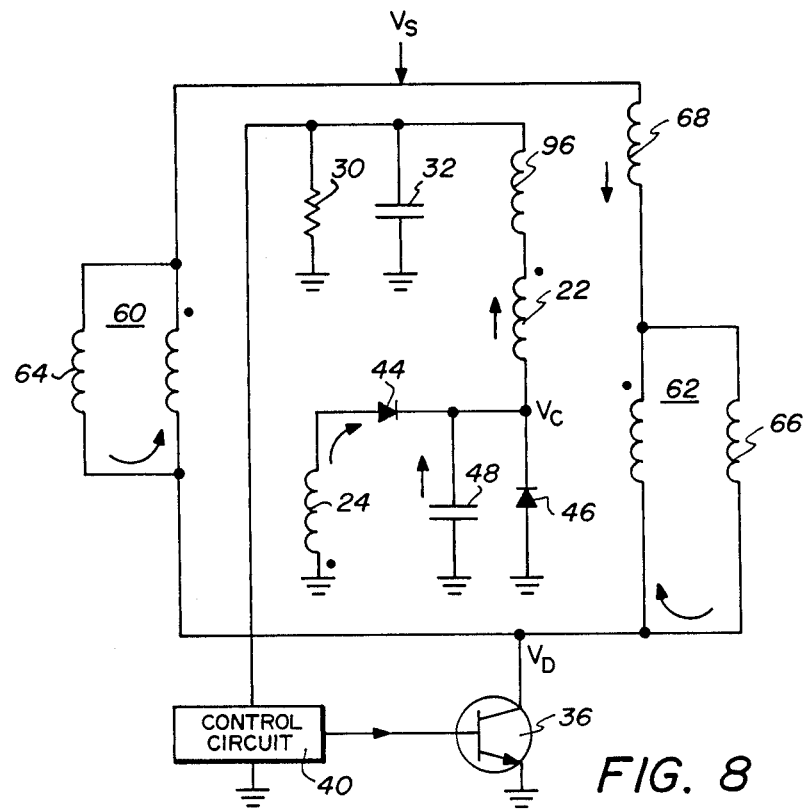
FIG. 8 represents an electric circuit equivalent of the integrated magnetic power converter shown in FIG. 7.

Referring now to FIGS. 7 and 8, a further embodiment of the present invention is illustrated including a power converter, generally identified by the numeral 90. Like numerals are used for like and corresponding elements previously identified with respect to FIGS. 1 and 4. Power converter 90 includes the addition of windings 92 and 94 in series with first secondary winding 22. Winding 92 and 94 are electrically 180° out-of-phase and physically disposed 90° from first secondary winding 22 on core 12. Alternatively, windings 92 and 94 may be in series with primary winding 20 and disposed on core 12 between legs 14 and 16. Power converter 90 provides for increased energy storage due to load current flowing through windings 92 and 94. FIG. 8 illustrates an electric circuit equivalent of power converter 90. Conductor 96 is illustrated to represent energy storage inductance due to windings 92 and 94. The dotted lines of FIG. 2 illustrate the operation of power converter 90 which reduces the ripple in these signals.

Figure 9A:
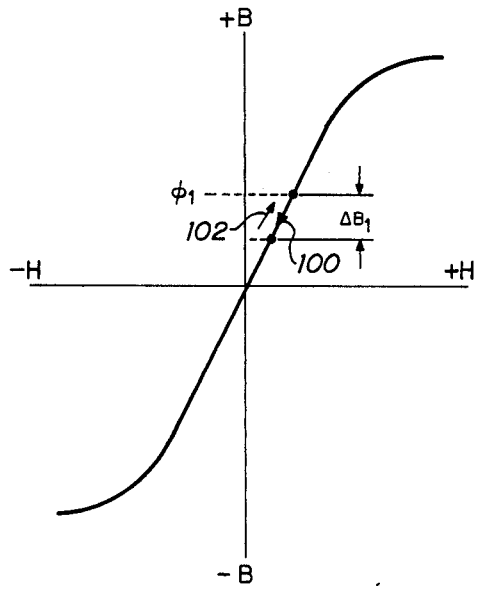
FIGS. 9a, 9b, 9c and 9d are magnetic flux—magnetic field intensity hysteresis loops illustrating the operation of the present invention.
Figure 9C:
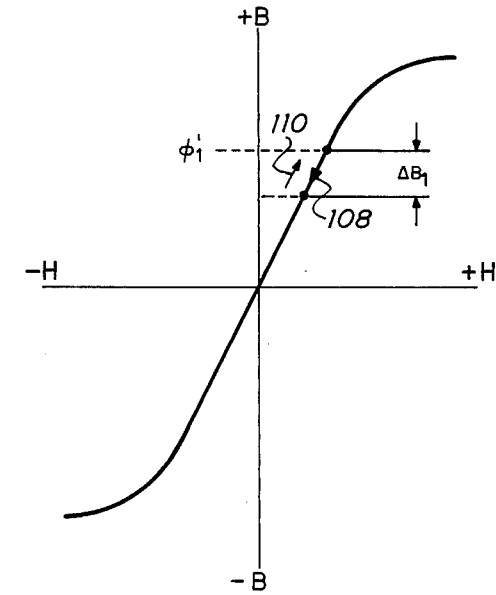
Figure 9B:
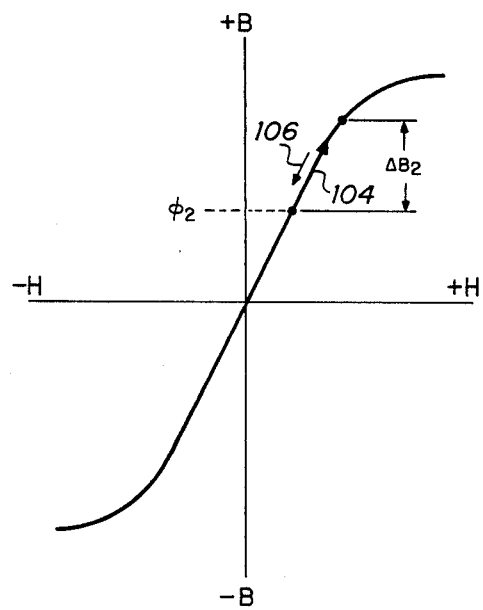
Figure 9D:
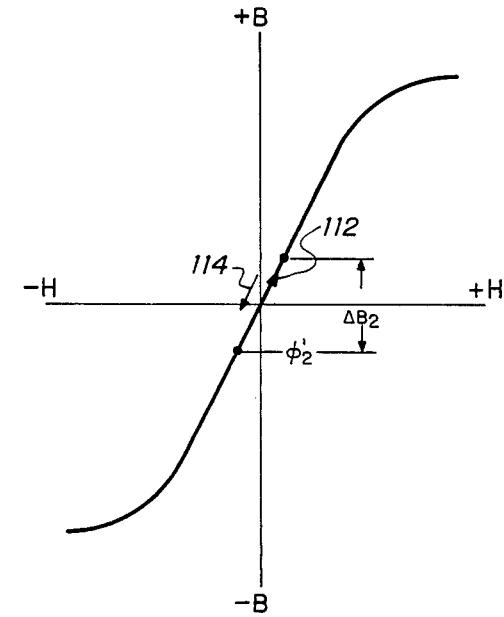

Referring now to FIG. 1 and FIGS. 9a, 9b, 9c and 9d, as previously stated, the present invention utilizes a mismatch between the number of turns of first secondary winding 22 and second secondary winding 24. This mismatch results in a lower or net negative flux in leg 14 of core 12. FIGS. 9a and 9b illustrate the magnetic flux densities where the number of turns of first secondary winding 22 equals the number of turns in second secondary winding 24. FIGS. 9c and 9d illustrate the flux densities where the number of turns of first secondary winding 22 is greater than the number of turns in second secondary winding 24. FIGS. 9a and 9c illustrate the flux density in leg 16 of core 12, and FIGS. 9b and 9d represent the flux densities within leg 14 of core 12.

Referring to FIG. 9a, arrow 100 represents the direction of change of flux in leg 16 when switch 36 is on, and arrow 102 denotes the direction of change of flux within leg 16 when switch 36 is off. In FIG. 9b, arrow 104 represents the direction of change of flux within leg 14 wherein switch 36 is on, and arrow 106 indicates the direction of change of flux within leg 14 when switch 36 is off. The operating point flux density $\phi_1$ present in leg 16 is equal to the operating point flux density present within leg 14, $\phi_2$. The change in the flux is greater within leg 14 ($\Delta B_2$) than leg 16 of core 12 ($\Delta B_1$). The direction of the change in flux in leg 16 is in the direction of arrow 50 (FIG. 1) when switch 36 is off and in the direction opposite arrow 50 when switch 36 is on. The direction of the change in flux in leg 14 is in the direction of arrow 52 (FIG. 1) when switch 36 is on and in the direction opposite arrow 52 when switch 36 is off.

Referring to FIG. 9c, where the number of turns within first secondary winding 22 is greater than the number of turns of second secondary winding 24, arrow 108 indicates the direction of change of flux when switch 36 is on, and arrow 110 indicates the direction of change of flux when switch 36 is off. The operating point flux density present within leg 16, $\phi'_1$ is greater than $\phi_1$ (FIG. 9a) as a result of the winding mismatch.

FIG. 9d illustrates the flux flowing within leg 14 when the number of turns of first secondary winding 22 is greater than the number of turns of second secondary winding 24. Arrow 112 denotes the direction of change of flux when switch 36 is on, and arrow 114 indicates the direction of change of flux when switch 36 is off. The overall change in flux density of FIG. 9d ($\Delta B_2$) is the same as the change in flux density ($\Delta B_2$) of FIG. 9b. The direction of change of flux density is also the same as for FIGS. 9a and 9b where there is no turns mismatch. It therefore can be seen that the turns mismatch changes the operating point flux density only ($\phi_1'$ and $\phi_2'$). The flux excursions are the same; however they occur along different portions of the hysteresis loop providing increased flux swing before core saturation can occur.

It therefore can be seen that the present invention provides for an integrated magnetic power converter in which no physical windings are required on the inductive energy storing portion of a core. The present power converter results in a simple, electrically efficient and flexible power converter in which the magnetic weight, size and cost are decreased while not compromising desired performance features. The present invention further provides for an automatic reset of the flux density within the core utilizing a storage capacitor and the use of mismatched secondary windings in order to drive the flux density negative, thereby increasing the allowable AC flux swing before saturation occurs. The ability to drive the flux level negative results in greater power delivery with smaller-sized cores. ability to drive the flux level negative results in greater power delivery with smaller-sized cores.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. An integrated magnetic power converter for supplying power to a load comprising:
   a continuous magnetic structure having first and second legs and a magnetic path therebetween;
   primary winding means wound on said first leg;
   first secondary winding means wound on said second leg and connected to the load;
   second secondary winding means in series with said first secondary winding means and wound on said first leg;
   first circuit means connected to said primary winding means for supplying energy to the power converter;
   second circuit means coupled to said secondary winding means for transferring energy to the load; and
   third circuit means coupled to said secondary winding means for transferring energy from said first secondary winding means to the load, such that when energy is supplied to said primary winding means for transformation to said first secondary winding means, a magnetic flux is produced in said magnetic path for power transfer to the load and an amount of energy is stored in the area surrounding said magnetic structure and said magnetic path, and when energy applied to said primary winding means is removed, said stored energy induces a magnetic flux in said magnetic path and energy is transferred to the load via said first and second secondary winding means and said second circuit means.

2. The power converter of claim 1 wherein said second circuit means includes means for preventing current flow from said second secondary winding means to said first secondary winding means while energy is being supplied to said primary winding means to thereby permit the storage of energy around said magnetic structure and to permit current flow from said second secondary winding means to the load when energy supplied to said primary winding means is removed thereby generating an induced current in said secondary winding means.

3. The power converter of claim 1 and further including an air-gapped leg disposed between said first leg and said second leg and wherein said energy is stored in said air-gap when energy is supplied to said primary winding means.

4. The power converter of claim 1 wherein the direction of said magnetic flux in said magnetic path when energy is supplied to said primary winding means is in a first direction in said magnetic structure and when energy is removed from said primary winding means, the direction of said magnetic flux is in a second direction opposite said first direction in said magnetic structure along said magnetic path.

5. The power converter of claim 4 wherein said first circuit means is connected to said primary winding means for providing periodically occurring spaced power stroke time periods, such that when current flows in said primary winding means during a power stroke time period, current flows only in said first secondary winding means in said first direction and energy is stored in the area around said magnetic structure in response to said current and when current flows in said second secondary winding during a non-power stroke time period, current flows in said first secondary winding in said second direction.

6. The power converter of claim 5 wherein said second circuit means includes rectifier means in series with said secondary windings for permitting current to flow to the load only during time periods between said power stroke time periods.

7. The power converter of claim 6 wherein said third circuit means includes rectifier means in series with said first secondary winding means for permitting current to flow to the load only during power stroke time periods.

8. The power converter of claim 1 wherein said first secondary winding means includes a plurality of windings and said second secondary winding means includes a plurality of windings, the number of said second secondary windings being less than the number of said first secondary windings, such that a negative flux level occurs in a portion of the magnetic structure when power is removed from said primary winding means.

9. The power converter of claim 8 and further including:
   energy storage means interconnected to said secondary windings means for storing energy when energy is removed from said primary winding means and for reducing the energy stored in said magnetic structure, said energy storage means further discharging energy to the load when energy is supplied to said primary winding means.

10. The power converter of claim 1 and further including:

energy storage means interconnected to said secondary windings means for storing energy when energy is removed from said primary winding means and for reducing the energy stored in said magnetic structure, said energy storage means further discharging energy to the load when energy is supplied to said primary winding means.

11. The power converter of claim 10 wherein said energy storage means comprises a capacitor for reducing the energy stored in said magnetic structure prior to the time period when energy is supplied to said primary winding means.

12. An integrated magnetic power converter for supplying power to a load comprising:
- a continuous magnetic structure having first and second legs forming a magnetic path therebetween;
- a primary winding including a plurality of turns wound on said first leg;
- a first secondary winding including a plurality of turns wound on said second leg;
- a second secondary winding including a plurality of turns wound on said first leg, said second secondary winding being in series with said first secondary winding and connected to the load;
- switch means connected to said primary winding for providing energy to the power converter during periodically occurring intervals to induce a flux in said magnetic structure during said periodically occurring intervals, the induced flux inducing a current in said secondary windings;
- first rectifier means connected to said secondary windings for transferring energy induced in the said secondary windings to the load when said switch means supplies power to the power converter, such that a current is generated in said magnetic path; and
- second rectifier means connected to said secondary windings for transferring energy stored in the area around said magnetic structure to the load when said switch means removes power from the power converter, such that a current is induced in said magnetic path.

13. The power converter of claim 12 wherein the direction of said magnetic flux change in said magnetic path when energy is supplied to said primary winding is in a first direction in said magnetic structure and when energy is removed from said primary winding, the direction of said magnetic flux change is in a second direction opposite said first direction in said magnetic structure along said magnetic path.

14. The power converter of claim 12 wherein said first rectifier means is connected in series with said first secondary windings and said second rectifier means is connected in series with said first and second secondary windings.

15. The power converter of claim 12 and further including:
- an air-gap leg centrally disposed between and parallel to said first and second legs.

16. The power converter of claim 12 wherein the number of turns of said first secondary winding is greater than the number of turns of said second secondary winding.

17. The power converter of claim 12 and further including:
- energy storage means interconnected to said secondary windings for storing energy when energy is removed from said primary winding and for reducing the energy stored in said magnetic structure, said energy storing means discharging energy to the load when energy is supplied to said primary winding.

18. The power converter of claim 17 wherein said energy storage means comprises a capacitor for reducing the energy stored in said magnetic structure to approximately zero prior to the time period when energy is supplied to the primary winding.

19. The power converter of claim 12 and further including:
- third and fourth windings in series with said first secondary winding and being disposed on said magnetic structure between said first and second legs.

20. A method for transferring energy to a load using an integrated magnetic power converter comprising the steps of:
- periodically supplying power to a primary winding of the power converter;
- transferring energy from the primary winding to a first secondary winding of the power converter through the magnetic core when power is supplied to the primary winding while preventing energy transfer from a second secondary winding to the first secondary winding;
- transferring energy from the second secondary winding to the first secondary winding of the power converter when power is removed from the primary winding, the energy being induced in the second secondary winding from the energy stored in the area around the power converter core; and
- transferring energy from said first secondary winding to the load.

21. The method of claim 20 and further including the step of:
- resetting the flux change in the magnetic core to approximately zero prior to supplying power to the primary winding.

22. The method of claim 21 wherein the step of resetting the flux level includes:
- storing energy in a storage element when power is removed from the primary winding.

23. The method of claim 22 and further including the step of discharging energy stored in the storage element to the load when power is supplied to the primary winding.

24. The method of claim 20 and further including the step of:
- winding the first secondary winding with a greater number of turns than the number of turns in the second secondary winding in order to lower the flux level in a portion of the magnetic core prior to supplying power to the primary winding.

25. The method of claim 24 and further including the step of:
- resetting the flux change in the magnetic core to approximately zero prior to supplying power to the primary winding.

26. The method of claim 25 wherein the step of resetting the flux level includes:
- storing energy in a storage element when power is removed from the primary winding.

27. The method of claim 26 and further including the step of:
- discharging energy stored in the storage element to the load when power is supplied to the primary winding.

* * * * *